United States Patent
DeLange et al.

(12)

(10) Patent No.: US 6,609,735 B1
(45) Date of Patent: Aug. 26, 2003

(54) THREADED AND COUPLED CONNECTION FOR IMPROVED FATIGUE RESISTANCE

(75) Inventors: Richard W. DeLange, Houston, TX (US); M. Edward Evans, Spring, TX (US)

(73) Assignee: Grant Prideco, L.P., The Woodlands, TX (US)

( * ) Notice: Subject to any disclaimer, the term of this patent is extended or adjusted under 35 U.S.C. 154(b) by 0 days.

(21) Appl. No.: 09/358,205

(22) Filed: Jul. 21, 1999

Related U.S. Application Data

(60) Provisional application No. 60/094,480, filed on Jul. 29, 1998.

(51) Int. Cl.$^7$ ................................................ F16L 35/00
(52) U.S. Cl. ........................ 285/334; 285/333; 285/355
(58) Field of Search ................................ 285/334, 333, 285/390, 355, 383

(56) References Cited

U.S. PATENT DOCUMENTS

| | | | | |
|---|---|---|---|---|
| 2,772,102 A | * | 11/1956 | Webb | .......................... 285/334 |
| 3,109,672 A | | 11/1963 | Franz | |
| 3,359,013 A | * | 12/1967 | Knox et al. | .................... 285/13 |
| 3,572,771 A | * | 3/1971 | Redwine | ..................... 285/173 |
| 3,572,777 A | * | 3/1971 | Blose | .......................... 285/334 |
| 4,384,737 A | * | 5/1983 | Reusser | ...................... 285/334 |
| 4,508,375 A | * | 4/1985 | Patterson et al. | ........... 285/334 |
| 4,548,431 A | | 10/1985 | Hall et al. | |
| 4,550,937 A | * | 11/1985 | Duret | .......................... 285/334 |
| 4,671,544 A | * | 6/1987 | Ortloff | ......................... 285/334 |
| 5,092,635 A | * | 3/1992 | DeLange et al. | ........... 285/334 |
| 5,184,495 A | | 2/1993 | Chunn et al. | |
| 5,355,968 A | | 10/1994 | Smith | |
| 5,358,289 A | * | 10/1994 | Banker et al. | ............... 285/334 |
| 5,360,239 A | * | 11/1994 | Klementich | ................... 285/94 |
| 5,361,846 A | | 11/1994 | Carlin et al. | |
| 5,415,442 A | * | 5/1995 | Klementich | ................. 285/331 |
| 5,535,837 A | | 7/1996 | Carlin | |
| 5,826,921 A | * | 10/1998 | Woolley | ...................... 285/334 |
| 5,931,511 A | * | 8/1999 | DeLange et al. | ........... 285/334 |

FOREIGN PATENT DOCUMENTS

| | | | | |
|---|---|---|---|---|
| DE | 3927436 | | 10/1990 | |
| DE | 3927436 A1 | * | 10/1990 | ................. 285/334 |
| EP | 0454148 A2 | * | 4/1991 | ................. 285/334 |
| GB | 13716 | * | 3/1919 | ................. 285/383 |
| IT | 464847 | * | 2/1952 | ................. 285/390 |

* cited by examiner

*Primary Examiner*—J. J. Swann
*Assistant Examiner*—Carlos Lugo
(74) *Attorney, Agent, or Firm*—Carlos A. Torres; Browning Bushman, P.C.

(57) ABSTRACT

Threaded and coupled pipe connections are provided with a number of design features that increase resistance of the connection to fatigue failure from cyclical side loading. The features acting alone or in combination include the provision of a pin thread that is formed along a single taper and that vanishes at the surface of the pipe. The coupling engages the pin such that the threaded area of the coupling engages all of the pin threads and extends beyond the vanish point of the pin threads at the optimum coupling makeup position. The threads of the coupling and pipe may engage along both the stab and load flanks to distribute the side loading. The external surface of the coupling may be tapered from the center toward each coupling end to reduce the stiffness ratio of the connection, and the ends or faces of the coupling may be reduced in radial thickness to prevent coupling splitting. The coupling length may be extended to exceed standard coupling lengths to provide the additional threaded area and/or taper areas and/or reduced stiffness ratios.

14 Claims, 1 Drawing Sheet

THREADED AND COUPLED CONNECTION FOR IMPROVED FATIGUE RESISTANCE

RELATED APPLICATION DATA

This application claims the benefit of U.S. Provisional Patent Application Ser. No. 60/094,480, filed Jul. 29, 1998.

BACKGROUND OF THE INVENTION

1. Field of the Invention

The present invention relates to connectors for joining oilfield tubulars. More specifically, the present invention relates to an improved coupling and threading arrangement and design for securing tubular connectors together with a connection that resists cyclic bending loads.

2. Description of the Prior Art

Tubular strings of pipe used in the drilling and completion of oil wells are subjected to both axial and lateral stresses during their installation and operation. Lateral forces, in the form of side bending loads, are encountered, for example, in riser pipe strings that extend from the water bottom to a drilling or production structure at the water surface. Tubulars employed in these situations are typically provided with integral, shouldering-type connections, and/or weld-on connections, that are particularly well suited for resisting the fatigue-inducing effects of the cyclical side loading. Connections of this type, which have been developed to provide high fatigue resistance, include tool joints and specialty connectors for risers. These connections, as compared with conventional threaded and coupled connections, are substantially more expensive to fabricate and typically require a larger lateral dimension to accommodate the connection design.

Conventional threaded and coupled pipe is subject to rapid fatigue failure when exposed to the cyclical side loading conditions that are designed to be met by the more expensive integral joint and welded joint designs. In a typical cyclical side loading failure, the pin of a conventional threaded and coupled connection experiences a fatigue-induced failure at a point adjacent the coupling end. Because of the conventional thread and coupling construction, side loading cyclical forces are directed into the pin at the end of the coupling and cooperate with the thread structure on the pin itself to produce fatigue failures. The concentration of stresses results in part from the structural resistance encountered at the end of the coupling with the underlying pipe pin material. The threads in the same area act to concentrate the bending stresses in the pin thread root where the failure ultimately occurs.

Another feature of some conventional, interference fit coupled and threaded connections, such as API buttress-style thread forms, is that the threads engage along only one thread flank upon makeup. This type of connection must completely unload the contacting flank, undergo relative movement between the pin and the coupling until the opposite flanks contact, and then transfer load to the newly contacting flank. Repeated, cyclical side loading and load transfers make these connection types especially susceptible to fatigue failures.

SUMMARY OF THE INVENTION

Threaded and coupled pipe is provided with a design that allows it to be used in cyclical, side loaded applications with increased resistance to fatigue damage to replace more costly upset and welded connections. In one embodiment, incorporating multiple features of the invention, the pin (or male) thread of the connection is machined along a tapered path such that the diameter of the thread is increasing at a constant rate away from the end of the pipe. The threads are machined at a constant taper angle until they completely vanish from the outside diameter (OD) surface of the pipe. The threads of the pin and coupling have stab and load flanks that engage with each other upon makeup of the coupling to the pin. The coupling threaded area is longer than a standard coupling so that the coupling completely engages all of the pin threads and extends beyond the thread run-out on the pipe OD. The coupling thread length ensures that the threads on all pins having thread lengths within accepted ranges will be fully engaged by coupling threads. The coupling is further modified by providing a long external bevel on the OD starting at the face of the coupling and extending to a location at or beyond the last point of full depth pin threads. In the engaged position, the end of the coupling extends beyond the vanish point of the pin threads and tapers to a relatively thin face width. The width of the face is made as thin as practical without rendering it overly prone to mechanical handling damage. While the bevel, as described, is conical, it will be understood that other shapes, e.g., an annular, smooth shallow concave depression in the conical surface, could be employed. In general, there must be a transition—i.e., thinner to thicker—so long as the transition is without any abrupt changes in geometry.

The length and starting point of the taper are determined as a function of the pipe OD and the pipe wall thickness. The larger the pipe OD, and the thicker the pipe wall, the longer the external taper on the coupling. The length (L) of the bevel can be considered in the context of a stiffness gradient spanning the distance between the end or face of the coupling and the point on the OD of the coupling where the bevel ends, which will be recognized as being a point intermediate the ends or faces of the coupling. Stiffness of a tubular body is defined as $[OD^4 \text{ (in.)} - ID^4 \text{ (in.)}] \times \pi/64$ where ID is the internal diameter of the tubular body and OD is the outside diameter of the body. It is desired that the stiffness gradient of the bevel be from 0.15 to 0.4 per inch of length of the bevel. To determine the gradient, assume the stiffness of the coupling at the end or face is $S_1$, the stiffness of the pin or pipe at that point is $S_2$, and the ratio of $S_1:S_2$ equals $R_1$, whereas the stiffness of the coupling where the bevel intersects the coupling OD is $S_3$, the stiffness of the pin at that point is $S_4$, and the ratio of $S_3:S_4$ is $R_2$. The gradient is thus $(R_1-R_2)/L$ and is from about 0.14 to about 0.4 per inch of length of the bevel. With respect to the radial thickness of the face or end of the coupling, it is desired that the stiffness ratio at that point, defined above as ratio of $S_1:S_2$, be 0.1 to 0.4.

From the foregoing it may be appreciated that an important object of the invention is to provide a threaded and coupled connection for tubular members forming a pipe string that resists fatigue damage in cyclical side loading applications.

Another object of the present invention is to provide a threaded and coupled connection having the resistance to side loading and fatigue damage normally limited to connections such as tool joints and specialty connections employing upset pipe and connections welded onto the upset pipe end.

Yet another object of the present invention is to provide a low-cost coupling for securing the threaded ends of pipe together in a connection that resists cyclical side loading fatigue damage.

It is also an object of the present invention to provide a threaded and coupled connection for a pipe subjected to cyclical side loading that can be machined on conventional equipment used for coupled and threaded pipe, has relatively small lateral dimensions, and can resist the effects of side loading without use of shouldering connections, or upset and welded connections commonly required for such applications.

An important object of the present invention is to provide a coupling having an internally threaded area that will mate with all of the pin threads of any pin having a thread form within a normally accepted range.

A related object of the present invention is to provide a pin thread on a pipe that extends to a vanish point on the pipe surface such that all of the pin threads will be engaged by the threads of a similarly threaded coupling having coupling threads that extend beyond the vanish point of the pin thread when the pin and coupling are fully engaged.

Another object of the present invention is to provide a thread profile for a pin and coupling connection in which the stab and load flanks of the threads engage simultaneously upon makeup to reduce stress concentration in a cyclically side loaded tubular pipe string.

Yet another object of the present invention is to provide a coupling that is longer than the standard coupling length and that includes an internal thread area that engages all of the pin threads and extends beyond the threaded area of the pin and over the unthreaded part of the pin to improve resistance to cyclical side loading of the threaded connection.

The foregoing, as well as other, features, objects, and advantages of the present invention will be more fully appreciated and understood by reference to the following drawings, specification, and claims.

DESCRIPTION OF A PREFERRED EMBODIMENT OF THE INVENTION

Figure 1:
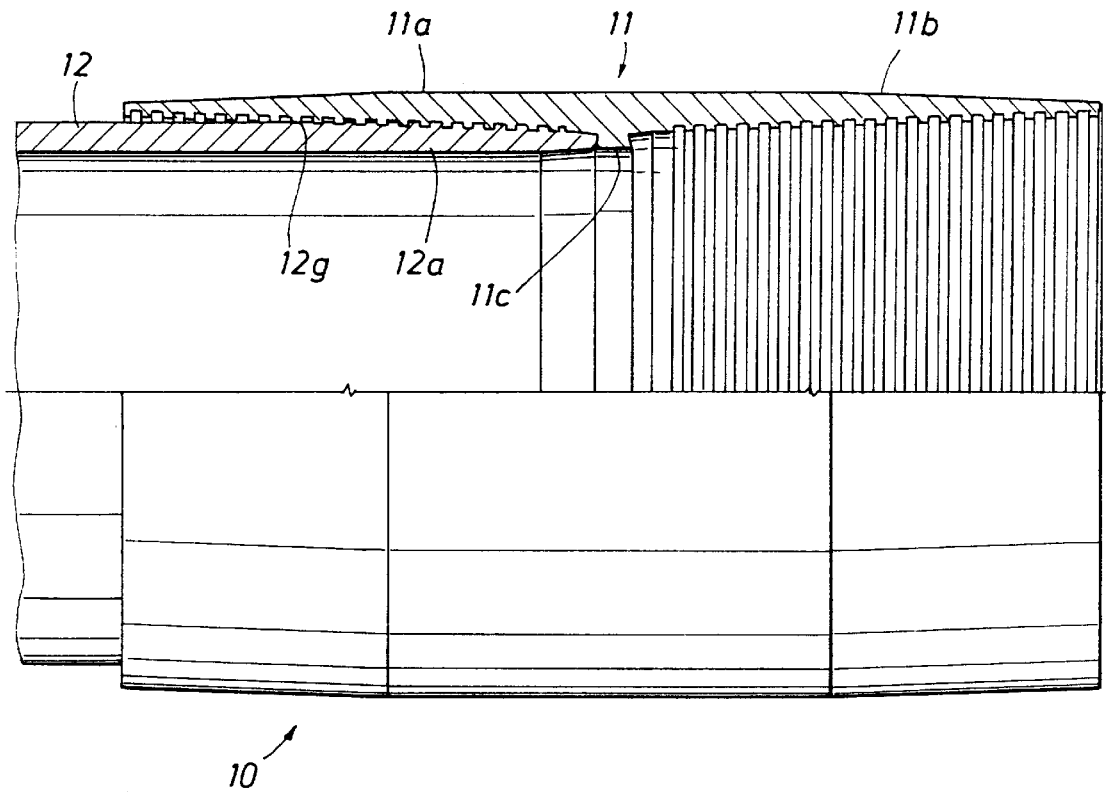
FIG. 1 is a vertical elevation, in quarter section, showing a section of a coupled and threaded connection of the present invention.

The threaded and coupled connection of the present invention is indicated generally at 10 in FIG. 1. The connection includes a steel coupling 11 having two internally threaded sections 11a and 11b with a steel pin 12 having a pin section 12a engaged in the threaded section 11a. A similar pin section (not illustrated) may be engaged in the coupling section 11b to secure another pipe section. A string of such pipes is formed by securing the ends of multiple pipe sections with couplings to form an extended tubular string for a drilling, completion, or production process.

Figure 2:
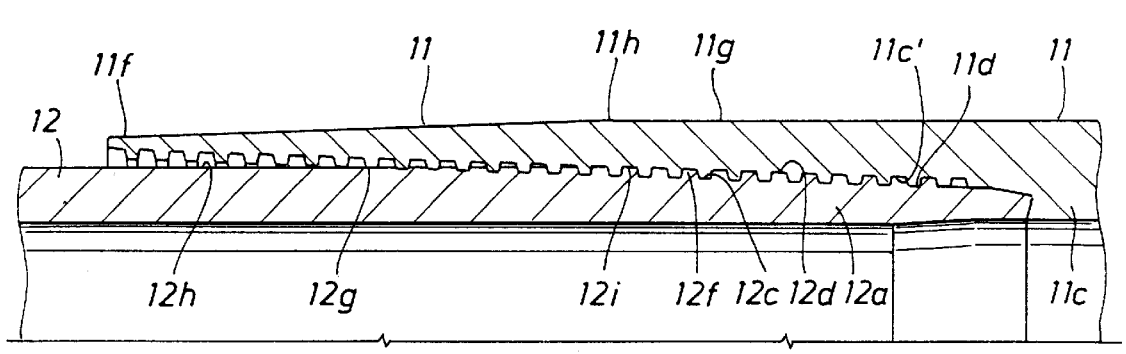
FIG. 2 is partial vertical cross-sectional view illustrating details in the thread configuration and design of the coupling and pin of the present invention.

As may be seen by joint reference to FIGS. 1 and 2, the end of the threaded pipe section 12a engages and seats against an annular, reverse angle internal shoulder 11c formed centrally within the coupling 11. The coupling section 11a, which is similar in construction to the segment 11b, includes a helically developed thread with crest 11c' and root lid that advances on an open extending taper towards the external end 11f of the coupling section 11. Pin threads having a helical root 12c and helical crest 12d mate within the threads of the coupling section 11a. The threads formed on the pin section 12a taper outwardly along the same taper cone as that of the coupling threads in the manner illustrated in FIGS. 1 and 2.

The taper of the coupling thread continues substantially uniformly from its onset adjacent the shoulder area 11c to its termination adjacent the coupling end 11f. The threads cut on the pin taper beginning from the end of the pin and extending back towards the pipe body are also formed along the same taper that eventually carries beyond the external dimension of the pipe outside diameter.

The last full thread formed on the pin is indicated at 12f. Thread roots further up the pin taper become shallower as the taper dimension moves away from the pipe body. Eventually, the thread taper of the pin is such that the pin body is no longer within the taper cone, which occurs at a vanish point 12g. The fully developed-coupling threads continue beyond this point and extend over a non-threaded portion 12b of the pipe pin 12a.

A cylindrical outside diameter surface of the coupling 11 begins to taper at a point 11h toward the end of the coupling 11f. The result is a conical outer dimension on the end of the coupling that begins at 11h, which is also coincident with the last point of full depth pin threads 12f.

Figure 3:
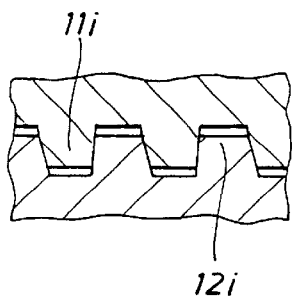
FIG. 3 is a partial sectional view of an engaged threaded section of the coupling and pin of the present invention.

FIG. 3 illustrates the engagement of the pin and coupling threads indicated respectively at 12i and 11i. As illustrated best in FIG. 3, the threads 12i and 11i are fully engaged on both flanks formed at either side of the thread crest. Many conventional threads, including API buttress threads, when fully made up engage along only a single flank of the interengaged thread profiles.

As best illustrated in FIG. 1, the threaded area 11a of the coupling 11 extends beyond the end of the threaded pin area marked by the vanish point 12g. The excess threaded area of the coupling ensures engagement of coupling threads with the threads of pins having threaded lengths greater than that of the pin 12.

The length of the coupling and pin threads, the length of the external coupling taper, and the thickness of the coupling face are functionally interrelated and depend upon the pipe diameter and pipe wall thickness, as well as the material of pipe and coupling construction.

A specific form of the invention has been constructed in which the length of the external coupling taper is equal to approximately one-half the length of the coupling threaded area underlying the tapering section. Preferably, the taper is at least as much as one-fourth of the length of the coupling threaded area. The length of the coupling between the point of the last full depth thread engagement and the coupling end is approximately equal to the length of engaged thread between the last full depth thread engagement and the pin end. The coupling face of the connection was approximately 0.050 inches in radial thickness.

From the foregoing, it will be appreciated that the invention provides a threaded and coupled pipe connection arrangement in which the pin thread is machined along a tapered path such that the diameter of the threads is increasing at a constant rate away from the end of the pipe. The threads are machined at the constant taper angle until they completely vanish from the outside diameter of the pipe. The threads may be of a design such that the stab and load flanks engage with each other upon makeup of the coupling to the pin. The coupling may be longer than the standard couplings employed in threaded and coupled pipe or may be otherwise configured so that the threads of the coupling completely engage all of the pin threads of any pin having threads within an acceptable range. The elongated or standard coupling may be further modified by providing a long bevel on the outside diameter of the coupling starting at the face of the coupling and extending to a location over approximately the last point of full depth pin threads. The coupling and, particularly, the elongated coupling with the long OD bevel may be further modified by making the width of the coupling face as thin as practical. In one exemplary application, the thickness of the coupling face was made to 0.050 inches in radial dimension. The lower limit on the face thickness is dictated by the need to have sufficient strength to resist damage from normal handling.

The features of the present invention include the provision of completely vanishing threads on the pin end. The completely vanishing threads on the pin gradually guide any applied tension, compression, or bending loads under the threads to thus reduce stress concentration around the run-out threads occurring at the area adjacent the normal outside diameter of the pin body. Conventional run-out thread pins are designed with a theoretical pipe OD as a design constraint. However, because of variation of actual pipe OD, pipe straightness, pipe roundness, and the alignment of the pipe in the threading machine, the thread designs may actually have partial depth threads that abruptly end instead of having a true vanishing thread. When load is applied to pipe, whether it be tension, compression, or bending, the partial depth threads cause an abrupt change in the distribution of load in the pipe wall, causing a stress concentration.

Another feature of the present invention is the provision of elongated coupling threads. Lengthening the coupling threads so that the threads of the coupling completely cover the vanish point of the pin threads provides for a gradual transfer of load between the pin and coupling that reduces the stress concentration in the end of the pin threads. Many conventional connection designs that employ a vanishing thread do not have threads in the couplings that engage and completely cover the pin threads. For example, the API eight-round thread has a complete vanish thread, but the vanish turn of the pin thread is on a different taper from the rest of the threads and the coupling threads do not engage the pin threads in the vanish cone area.

Provisions of a long bevel or taper on the coupling OD also contributes to the fatigue resistance to side loading of the connection. The taper allows for a gradual change in the stiffness of the made-up assembly. In conventional threaded and coupled pipe, abrupt changes in the stiffness increase the stress concentration in the run-out thread area. Conventional threaded and coupled pipe have couplings with a much shorter bevel or no bevel at all. In the preferred form of the invention, the taper of the coupling extends from the face of the coupling to a location over the last point of full depth pin threads.

Yet another feature contributing to the fatigue resistance to side loading of the connection is the use of a thin face at the coupling end. The thin coupling face provides flexibility in the portion of the coupling at the face. This flexibility reduces stress concentration in the run-out thread area. A suitable face may have a thickness equal to or less than the thickness of a thread length and coupling thickness at a last fully formed thread in the coupling adjacent the coupling end. Conventional coupling designs employ a very thick coupling face for field durability and lifting. Such thick couplings create an abrupt change in the stiffness of the made-up assembly that creates stress concentration in the run-out thread area.

Finally, the use of interference fit threads with contacting flanks also contributes to the fatigue resistance to side bending loads. Contact on both flanks of the threads upon assembly of the connection provides for a gradual transfer of load between the pin and coupling during cyclic bending of the made-up assembly. Connection designs that incorporate an API buttress-style thread form where both thread flanks do not engage upon make-up have to completely unload the contacting flank, undergo relative movement between the pin and coupling until the opposite flanks contact, and then transfer load to the newly contacting flank.

Each of the described features improves the fatigue resistance of the made-up assembly to cyclic side loading. Inclusion of all of the features in a single connection design provides a measure of fatigue resistance that competes with that provided by shouldering-, upset-, and welded-type connections. This improved performance is achieved using threaded and coupled connections that eliminate the welding and upsetting cost of tool joints and specialty riser connections. In severe applications where only the more expensive riser connections are required for handling extreme side loading conditions, the connector of the present invention may be used in the middle portion of the riser string where the cyclic bending forces are more moderate.

The foregoing description and examples illustrate selected embodiments of the present invention. In light thereof, variations and modifications will be suggested to one skilled in the art, all of which are in the spirit and purview of this invention.

What is claimed is:

1. A coupling for a threaded and coupled connector used to secure the ends of tubular pipe sections together comprising:

tubular coupling body having axially extending, internally threaded areas at each end of said coupling body, tapering external surfaces formed on said coupling body, each of said surfaces extending from a central portion of said coupling body toward the end of said body and reducing in diameter in an axial direction from said central portion toward the end of said body, said tapering external surfaces extending axially along said coupling body for functionally relating a taper length to the minimum outside diameter of the pipe section to which the coupling is to connect, wherein said taper extends over internal threads of said coupling that are radially disengaged from the external surface of the pipe section to which the coupling is to connect when the coupling is fully engaged with the pipe section, an internally formed annular seating area in said coupling body intermediate said internally threaded areas for engagement with the end of a pipe section, and wherein a coupling face is formed at each end of said coupling and the thickness of said coupling face is less than the thickness of a thread length and coupling thickness at a last fully formed thread in said coupling adjacent said coupling end.

2. A coupling as defined in claim 1 wherein said coupling face has a thickness of approximately 0.050 inches.

3. A coupling for a threaded and coupled connector used to secure the ends of tubular pipe sections together, comprising:

a tubular coupling body having axially extending, internally threaded areas at each end of said coupling body;

tapering external surfaces formed on said coupling body, each of said surfaces extending from a central portion of said coupling body toward the end of said body and reducing in diameter in an axial direction from said central portion toward the nearest end of said body, said tapering external surfaces extending axially along said coupling body for functionally relating a taper length to the minimum outside diameter of the pipe section to which the coupling is to connect; and wherein said taper extends over internal threads of said coupling that are radially disengaged from the external surface of the pipe section to which the coupling is to connect when the coupling is fully engaged with the pipe section.

4. A coupling as defined in claim 3 wherein said taper length is approximately one-half the length of the internally threaded area at the coupling end that is adapted to extend about the pipe section to which the coupling is to connect.

5. A coupling for a threaded and coupled connector used to secure the ends of tubular pipe sections together comprising:

a tubular coupling body having axially extending, internally threaded areas at each end of said coupling body, tapering external surfaces formed on said coupling body, each of said surfaces extending from a central portion of said coupling body toward the end of said body and reducing in diameter in an axial direction from said central portion toward the end of said body, said tapering external surfaces extending axially along said coupling body for functionally relating a taper length to the minimum outside diameter of the pipe section to which the coupling is to connect, and wherein the largest diameter of said taper begins at a point in the area of the last coupling thread, toward the coupling end, positioned to be fully engaged with the external thread of a pipe section to which the coupling is to be connected.

6. A threaded and coupled connector comprising:

pipe pin on the end of a tubular pipe body, said pin having a helically formed thread with a vanishing point on the external surface of the pipe; and a coupling having a tubular coupling body with axially extending, internally threaded areas at each end of said coupling body, said internally threaded areas each having an axial development that extends toward the nearest end of said coupling body past the point of engagement of one of said threaded areas with said vanishing point when said coupling threads of said one area are threadedly engaged with said pin threads.

7. A connector as defined in claim 6 wherein said coupling includes tapering external surfaces formed on said coupling body, each of said surfaces extending from a central portion of said coupling body toward the nearest end of said coupling body and reducing in diameter in an axial direction from said central portion toward the nearest end of said coupling body, said tapering external surfaces extending axially along said coupling body for functionally relating a taper length to the minimum outside diameter of the pipe section to which the coupling is to connect.

8. A connector as defined in claim 7, further comprising an internally formed annular seating area in said coupling body intermediate said internally threaded areas for engagement with the end of a pipe section.

9. A connector as defined in claim 6 wherein said threaded areas extend substantially to the ends of said coupling body.

10. A connector as defined in claim 6 wherein said coupling and pin have a stiffness ratio of between 0.1 to 0.4 at the coupling end.

11. A connector as defined in claim 7 wherein said tapering external surfaces form a bevel having a stiffness gradient of from 0.15 to 0.4 per inch of bevel length.

12. A connector as defined in claim 6 wherein said pin thread is formed on a single taper.

13. A connector as defined in claim 6 wherein said coupling body extends past said vanishing point in a direction away from said pin by more than one thread turn.

14. A connector as defined in claim 6 wherein said coupling includes threads unengaged with said pin threads.

* * * * *